United States Patent
Geis et al.

[15] 3,678,729
[45] July 25, 1972

[54] AUTOMATIC THERMOMETER CALIBRATION SYSTEM

[72] Inventors: James D. Geis, Cheshire; John H. Troll, Ridgefield; Harry Gluz, South Norwalk; Cole H. Baker, Stratford, all of Conn.

[73] Assignee: Iris Corporation, Hamden, Conn.

[22] Filed: Aug. 3, 1970

[21] Appl. No.: 60,596

[52] U.S. Cl. .................................................. 73/1 F
[51] Int. Cl. ........................................... G01k 19/00
[58] Field of Search ....................................... 73/1 F

[56] References Cited

UNITED STATES PATENTS

| | | | |
|---|---|---|---|
| 3,585,839 | 6/1971 | Bollinger | 73/1 F |
| 3,316,076 | 4/1967 | Blackman | 73/1 F |
| 3,377,837 | 4/1968 | Ayres | 73/1 F |

*Primary Examiner*—S. Clement Swisher
*Attorney*—Sandoe, Hopgood and Calimafde

[57] ABSTRACT

A system for automatically calibrating and classifying measuring instruments such as mercury clinical thermometers, by accurately determining the distance between two reference points established by two known reference parameters. The detection of the reference points is made by scanning a laser beam over the mercury column and detecting the change in the reflection characteristic of the beam at the upper level of the column.

13 Claims, 11 Drawing Figures

INVENTORS
JAMES D. GEIS
JOHN H. TROLL
HARRY GLUZ
COLE H. BAKER

BY Sandoe, Hopgood & Calimafde
ATTORNEYS

FIG. 2

INVENTORS
JAMES D. GEIS
JOHN H. TROLL
HARRY GLUZ
COLE H. BAKER

BY Sandoe, Hopgood & Calimafde
ATTORNEYS

FIG. 3      FIG. 4

INVENTORS
JAMES D. GEIS
JOHN H. TROLL
HARRY GLUZ
BY  COLE H. BAKER

Sandoe, Hopgood & Calimafde
ATTORNEYS

INVENTORS
JAMES D. GEIS
JOHN H. TROLL
HARRY GLUZ
BY COLE H. BAKER

Sandoe, Hopgood & Calimafde
ATTORNEYS

AUTOMATIC THERMOMETER CALIBRATION SYSTEM

The present invention relates generally to instrument calibration, and more particularly to a system for automatically calibrating and classifying measuring instruments such as mercury thermometers, and the like.

Measuring instruments such as clinical thermometers are commonly of the types employing a medium such as mercury, which rises within a narrow tube or capillary by an amount proportional to the value of a sensed external parameter, such as temperature.

In a clinical thermometer, a quantity of mercury is contained in a reservoir formed in a bulb at the lower end of the instrument. The reservoir communicates with the lower end of a narrow capillary bore formed in a transparent thermometer casing made of a suitable material such as glass or plastic. The extent to which the mercury rises in the capillary bore is proportional to the level of the measured temperature. When the thermometer is removed from the location at which the temperature measurement is made, the mercury in the capillary bore remains substantially at the level to which it was raised until the thermometer is vigorously shaken to thereby return the mercury column to its normal position.

The amount by which the mercury is raised along the axial dimension of the capillary bore in response to the measured temperature is a function, as noted above, of the level of that temperature, but is also proportional to the volume of mercury contained in the instrument as well as the volume of the bulb reservoir and the capillary. The latter factors are determined at the time the thermometer is manufactured. There are, however, minor variations introduced during the manufacturing process between different thermometers with respect to their capillary bore and bulb volumes, as well as the volume of mercury introduced into the instrument.

As a result of these variations in the critical thermometer dimensions, each thermometer must be separately calibrated to ensure uniform readings on all thermometers when exposed to corresponding external temperatures for measurement.

Heretofore, calibration of thermometers has been performed by immersing the initially uncalibrated thermometer into solutions or baths maintained at two reference temperatures, such as 98° F and 106° F. An operator supplied with an ink marking device draws a line or ink mark at the termination or discontinuity of the mercury column within the capillary bore established in response to both the lower and higher of the reference temperatures.

The distance between the two reference markings is measured and the thermometer is then categorized into one of a plurality of classes in correspondence to the distance between the markings. Thermometers falling in each class are thereafter calibrated by printing on them a graduated scale of temperatures, a different scale being provided for each class of thermometers. Thermometers in which the distance between the reference points falls outside the established classes are rejected as being unacceptable for use.

It will be appreciated that the presently employed procedures for thermometer calibration largely involve a series of manual operations, and are thus to a large extent nonautomatic in nature. That conventional procedure is relatively tedious, slow and imprecise. The need to train unskilled personnel to perform this task is also time-consuming and expensive, thus adding to the manufacturing cost and the ultimate cost to the customer.

Attempts have been made to automate the thermometer calibrating procedures in a practical and economical manner while still ensuring repeatability, accuracy, and rapid, reliable and low-cost operation. These attempts have, however, been by and large unsuccessful since no effective way has yet been developed to accurately determine the upper level of the mercury column established by the reference temperatures. For this reason, the instrument industry continues to employ the slow and tedious manual operations for calibrating mercury clinical thermometers as well as similar measuring instruments, such as barometers, and the like.

It is thus an object of the invention to provide an improved system for automatically calibrating measuring instruments, such as mercury thermometers and the like.

It is another object of the invention to provide an improved system for automatically classifying instruments such as mercury thermometers as a function to the response of the instrument to a set of reference parameters.

It is a further object of the invention to provide a system of the type described which is capable of calibrating large numbers of instruments in a continuous, substantially automatic, and yet reliable and high-speed manner.

It is still another object of the invention to provide an automatic instrument calibrating and classifying system in which laser, optical, analog, and digital techniques are employed to provide increased accuracy of calibration.

In the instrument calibration system of the invention, which is herein specifically disclosed for purposes of example, as a system for the automatic calibration of mercury clinical thermometers, the instrument (thermometer) is subjected to a first reference temperature after which the resulting level of the mercury column is detected. The instrument is then transported to a station at which it is exposed to a second reference temperature and the resulting level of the mercury column is again detected. The distance between the two detected reference levels is sensed and utilized to classify the thermometer into one of a plurality of categories.

In accord with one aspect of the invention, the level of the mercury column is accurately determined by means of sensing the change in the reflection characteristics of a laser beam from the mercury column that occurs at the meniscus of the column. It has been determined that the reflection of the laser beam from the mercury-containing section or from the section of the column containing no mercury is mostly horizontal although of significantly differing intensities; the intensity from the mercury containing portion being of the greater intensity. However, when the laser beam is directed at the concave meniscus formed at the upper surface of the mercury column, the reflection characteristic of the beam suddenly and sharply changes to a generally vertical orientation.

In the embodiment of the invention herein described, a first laser beam is caused to scan over the mercury column after the thermometer is exposed to the first reference temperature. When the characteristic change in the reflection from the upper surface of the mercury column is detected, the scanning of the beam is interrupted and an inking mechanism is actuated to apply a mark on the thermometer at the upper level of the mercury column to thereby establish a first reference line.

The thus marked thermometer is then moved to a second station at an elevated controlled temperature. The mercury column there rises to a second elevated level which is detected by the scanning of a second laser beam over the mercury column much in the same manner as in the first scanning and inking station. Means are provided at the second scanning station to produce a signal proportional to the distance between the upper level of the elevated mercury column and the previously inked line.

That distance signal is converted to a binary classification signal which is processed at an unloading and classification station along with an indexing signal representing the indexed position of the thermometer, to cause the automatic release of the thermometer into a particular receptacle corresponding to the thermometer classification.

To the accomplishment of the above and to such further objects as may hereinafter appear, the present invention relates to an automatic thermometer calibrating system substantially as defined in the appended claims and as described in the following detailed description of the invention taken together with the accompanying drawings in which:

The calibrating and classifying system of the present invention is herein specifically illustrated with reference to the automatic calibration of a clinical thermometer of the type commonly used to measure the temperature of a patient. A thermometer of this type is generally made of a transparent body or casing in which a bulb is formed at the lower end. A capillary bore is formed within the interior of the casing and a quantity of a suitable medium, most often mercury, is placed in the bulb and rises partially up the axial length of the capillary bore. As is known, the height to which the mercury rises in the capillary bore is a function of the temperature to which the bulb is exposed, so that the upper surface level of the mercury in the capillary, at which a concave meniscus is formed as a result of capillary action, provides a direct indication of that temperature.

As described above, to convert the height of the mercury within the capillary bore into a meaningful and accurate indication of temperature it is necessary to calibrate the thermometer at the time of its fabrication so that a numerical indication, such as the normal body temperature reading of 98.6° F, may be assigned to a particular height of the mercury column of a particular thermometer.

The system of the invention is directed to the automatic calibration of such thermometers and similar instruments, as well as to the automatic segregation or classification of thermometers at the time of their manufacture based on the distance between two levels of the mercury column established in response to two accurately controlled reference temperatures to which the instrument is exposed. Thermometers in which the distance between the two detected levels are greater or less than a predetermined value are automatically rejected.

Figure 1:
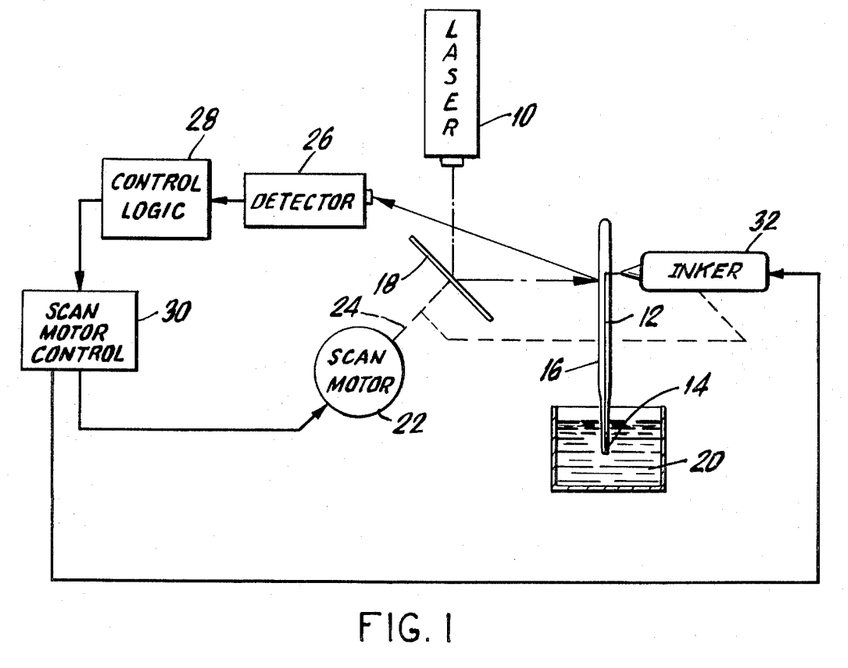
FIG. 1 is a schematic diagram illustrating the means by which the upper level of a mercury column in a measuring instrument is detected as employed in the system of the present invention.

In accordance with one aspect of the invention, the calibration of the instrument includes the detection of the upper level of the mercury column by scanning, as shown in FIG. 1, a narrow light beam, such as that produced by a laser 10, over a mercury column 12 extending upwardly from a bulb portion 14 formed at the lower end of a thermometer 16. It has been found that the reflection characteristics of the laser beam from the thermometer differ in accordance with the portion of the mercury column on which the beam is incident. More particularly, it has been found that the reflection of a laser beam from either the section of the capillary bore containing mercury or in the section of the bore in which there is no mercury, is generally horizontal. However, as the beam is scanned across the upper level of the mercury column, the meniscus formed thereat as a result of capillary action, causes the generation of a sharply, unique vertical reflection. The sensing of this sharp change in the reflection characteristic of the laser beam at the meniscus of the mercury column permits the detection of the upper level of the mercury column in a highly precise manner, in the order of accuracy of .0001 inch or better if beam shaping techniques are employed to narrow the width of the laser beam.

As is shown schematically in FIG. 1, the beam from laser 10 is caused to be incident on a mirror 18 and reflected from there onto the mercury column 12, which has risen to a height corresponding to the preset temperature of a reference temperature solution or bath 20 in which the bulb 14 of the thermometer is immersed. The laser beam is caused to scan vertically over the column by the operation of a step motor 22 coupled to mirror 18 by suitable mechanical means generally indicated 24. A detector or detector array 26 moved along with the scanning mirror 18, receives the beam reflected from the mercury column. Detector 26 is coupled to logic circuitry 28, described in greater detail below with respect to FIG. 8, which in turn is coupled to a scan motor control circuit 30. The latter in turn is coupled to motor 22 and to an inker 32 which is also mechanically coupled to motor 22 and moves along with mirror 18.

When detector 26 detects the unique reflection characteristic corresponding to the scanning of the laser beam over the upper level of the mercury column, it produces a signal which is processed in logic circuit 28 to produce at motor control 30 a disabling signal for motor 22 and an enabling signal for inker 32. As a result, scanning of the beam over the mercury column is temporarily halted and an ink line is printed on the thermometer casing at the level of the meniscus. The line thus formed accurately represents the height to which the mercury column has risen in response to the temperature of controlled temperature solution 20.

GENERAL SYSTEM ORGANIZATION

Figure 2:
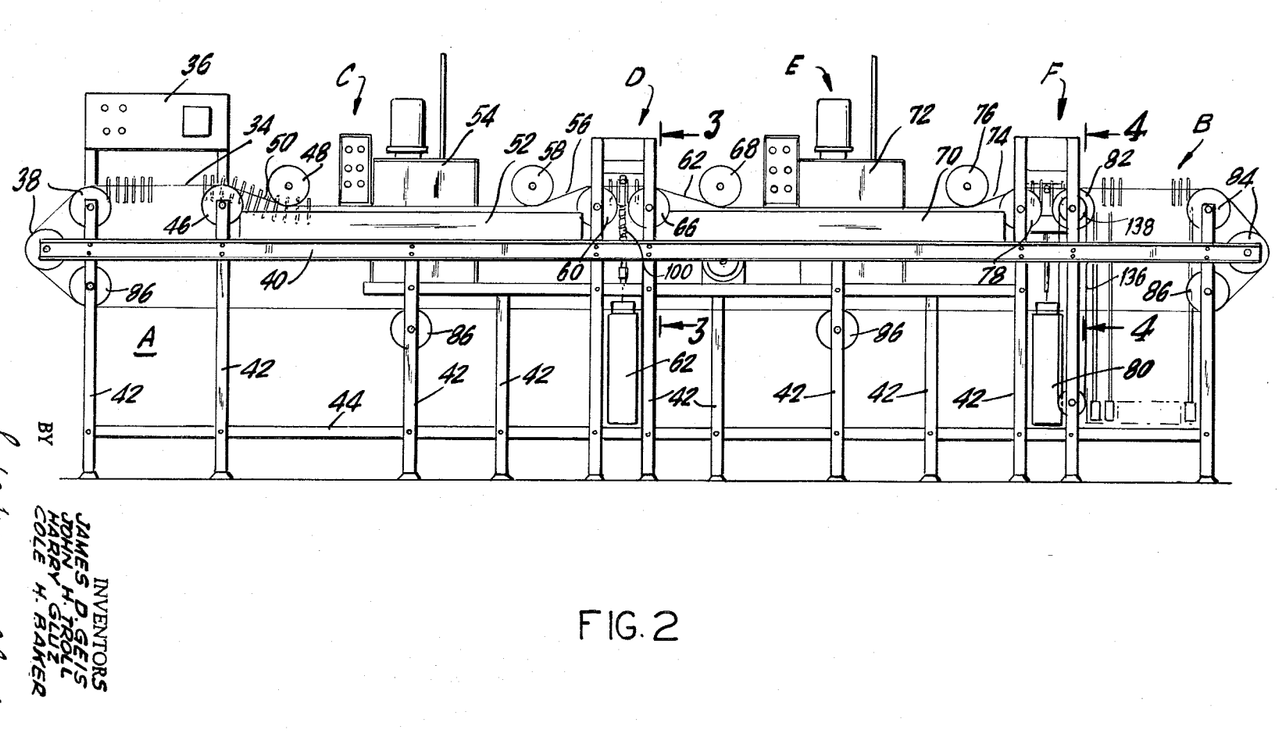
FIG. 2 is a side elevation of the calibrating and classifying station of the system of the invention.

In the system of the invention, as shown in its complete form in FIG. 2, a plurality of instruments here shown as thermometers are secured, by means more completely described with reference to FIG. 7, to the upper flight of a chain conveyor 34 at a loading and control station A. Conveyor 34 is incrementally driven between loading station A and an unloading and classifying station B by means of a sprocket wheel driven by a drive motor controlled from a switching and speed control panel 36 located at station A. The conveyor 34 passes over rollers 38 mounted at the loading end of the conveyor on a longitudinal support member 40. The latter is supported by a series of spaced vertical feet 42 which are in turn connected at their lower ends by a longitudinal strut 44. The thermometers loaded onto the upper flight of the conveyor belt at station A are incrementally moved over a pair of idlers 46 and 48, which urge the conveyor into a downwardly inclining path 50. Path 50 terminates at its lower end in a controlled temperature solution or bath 52 located at a first reference temperature station C. The temperature of bath 52 is kept substantially constant at a predetermined temperature, e.g. 98° F, by means of a temperature control system 54, the design of which is well known in the art and thus not further described herein.

During its travel through bath 52, the mercury level in each of the thermometers is raised to a first reference level in response to that temperature. This rise, as noted above, is a function of the volume of mercury in each thermometer as well as the volume of mercury in the bulb and the volume of the capillary bore. Since there are variations in one or all of these factors in the thermometers, there will be corresponding variations in the levels to which the mercury rises in response to the temperature in bath 52.

The thermometers are then moved incrementally over an upwardly inclined path 56 established by idler rollers 58 and 60 to remove the thermometers from bath 52 and transfer them into a scanning and inking station D, which corresponds to the apparatus shown schematically in FIG. 1.

In station D, a beam from laser 62 (laser 10 in FIG. 1), suitably mounted on the conveyor support, is sequentially and vertically scanned over the mercury columns in the thermometers passing through the station. When the characteristic reflection at the top of the mercury column is detected by the detector, a solenoid or the like is operated in a manner more completely described below to cause an ink marker to apply an ink line to each of the thermometers at the upper level of their respective mercury columns, to thereby establish a first 98° F reference line on each of the thermometers.

The thermometers are then sequentially and incrementally transferred out of station D down an inclined path 64 formed by idler rollers 66 and 68, and are then passed into a second controlled temperature bath 70 located at a second reference temperature station E. A temperature higher than the temperature at station C, such as 106° F, is established and precisely controlled in bath 70 by a temperature control system 72, which may be similar to control system 54 at station C. Upon entering the controlled temperature bath 70, the mercury levels in the thermometers rise to a second reference level above that established and detected at stations C and D respectively.

The thermometers are then removed from bath 70 along an upward incline 74 formed by rollers 76 and 68, and are thereafter incrementally transferred to a second scanning station F at which a beam from a second laser 80 is caused to sequentially and vertically scan over the mercury columns in the thermometers. As described more completely below with respect to the description of FIG. 4, the laser beam is scanned downwardly along the thermometer until the unique reflection characteristic at the upper meniscus of the mercury column is detected. The laser beam then continues to scan down the mercury column until it detects the ink line which was previously applied at laser scanning station D. A shaft encoder mechanically coupled to the scanning member produces a series of output pulses the number of which is proportional to the distance scanned between the two temperature reference levels; that is, the levels to which the mercury column rose in response to the temperatures of the two reference temperature stations.

The thermometers are then incrementally transferred out from the second scanning station F over an idler roller 82 and into the unloading and sorting station B, from which the thermometers are selectively removed from the conveyor belt and dropped into one of a preselected number of receptacles or bins corresponding to the measured distance between the two reference levels. That is, the position of thermometer release is a function of the number of pulses produced by the shaft encoder at the second scanning station. As herein described, the encoder pulses are converted into a digital code or number corresponding to the category that the thermometer is placed in accordance with the measured distance. The thermometers are thus automatically calibrated and classified according to their response to the two reference temperatures.

The thermometers received in each of the classification bins are then printed or stamped with a graduated scale between the two reference temperatures in a known manner, to form the finished thermometer, a different scale being imprinted on different categories of the thermometers. Those thermometers in which the distance between the two reference levels falls either above or below a preselected value are rejected as being unsuitable for use.

The conveyor belt passes over rollers 84 at the unloading station and then travels over return rollers 86 at the lower flight of the conveyor until it returns to the upper flight and loading station A, where it receives a new supply of uncalibrated thermometers.

FIRST SCANNING AND INKING STATION D

Figure 3:
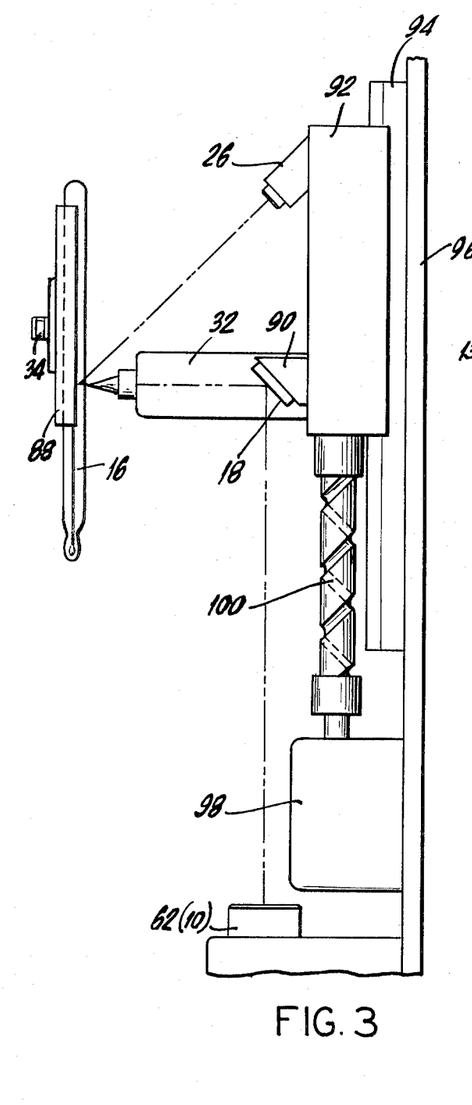
FIG. 3 is an elevation in schematic form of the first scanning and calibration station of the system of the invention, viewed in the direction of the arrows 3–3 in FIG. 2.

The first scanning and inking station D is illustrated in FIG. 3, which illustrates in more detailed from the system shown schematically in FIG. 1. Corresponding components in FIG. 3 are further identified, where there is correspondence, with the reference numerals used in FIG. 1. As shown in FIG. 3, the thermometer 16 is carried by a holder 88 which in turn is secured to the conveyor. The reflecting mirror 18 is mounted on a mirror holder 90, which in turn is secured to a slide or carrier 92. Carrier 92 is vertically movable along a guide 94 fixedly secured to a support post 96. The photodetector 26 is mounted on the upper portion of carrier 92 and is oriented so that its optical axis is directed along the axis of the reflected laser beam; that is, the beam from laser 62 (10) reflected from mirror 18 and then from the mercury column in the thermometer. Also mounted on carrier 92 and movable along therewith is the inker 32. As shown in FIG. 3, the central longitudinal axis of inker 32 lies along the axis of the beam reflected from mirror 18 onto the mercury column in the thermometer.

The reflected laser beam is scanned over the mercury column in the thermometer each time a new thermometer is indexed into position in station D by incrementally and vertically moving the carrier 92 to vary the vertical position of the mirror. As herein shown, vertical movement of the carrier with respect to the thermometer is produced by a stepping motor 98 mounted on support post 96 and having an output shaft coupled to a ball screw 100. The latter in turn is coupled at its upper end to carrier 92. The operation of stepping motor 98 in response to a drive signal produces incremental rotational motion of the ball screw, which in turn is converted to incremental vertical motion of the carrier.

As has been described above with reference to FIG. 1, when detector 26 senses the discontinuity at the upper meniscus of the mercury column, it produces a signal which operates in a manner more completely described below with reference to FIG. 8 to temporarily disable motor 98 and thus maintain the carrier and laser beam at a fixed vertical position. Shortly thereafter, a signal is produced which actuates a solenoid to cause inker 32 to spray a quantity of ink onto the thermometer casing at the location of the upper level of the column, to thereby form the inked line at the first temperature reference level. After the completion of the inking operation, the carrier is returned by the motor to its initial rest position and a new thermometer is indexed into position for scanning and marking.

SECOND SCANNING STATION F

Figure 4:
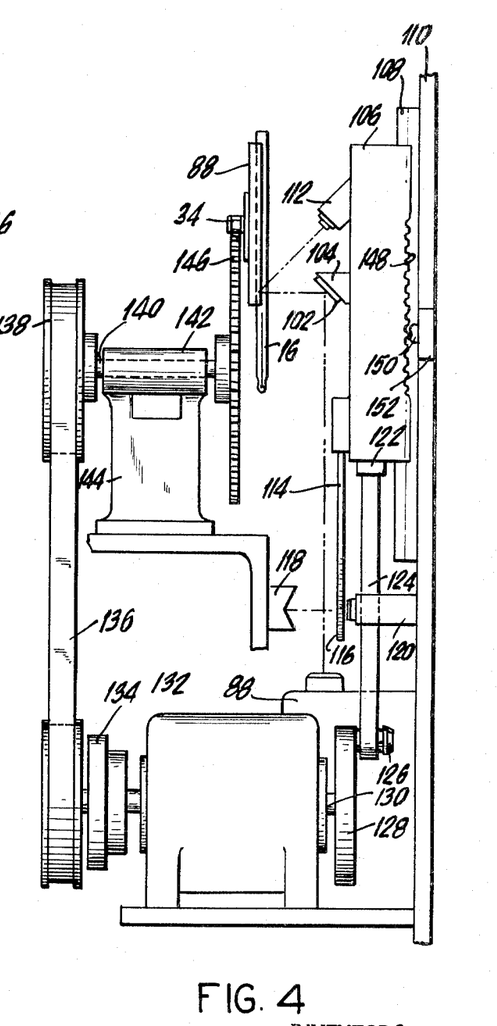
FIG. 4 is a view similar to FIG. 3 of the second scanning and temperature calibration station of the system as viewed in the direction of the arrows 4—4 in FIG. 2.

The second scanning station F at which the thermometer is again scanned by a laser beam after the mercury column has risen to its second elevated reference level as a result of its immersion in the controlled bath at station E, operates in a manner similar to that of the first scanning station. At station F a beam from laser 80 is caused to be reflected from an inclined mirror 102 mounted on a holder 104 which in turn is mounted on a carrier or slide 106. Slide 106, which is free to move vertically within a guide 108 mounted on a support post 110, also carries a photodetector 112 which is positioned as shown in FIG. 4 so that its optical axis lies substantially along the axis of the beam reflected from the mercury column of the thermometer.

A rod 114 is supported by and extends downwardly from slide 106 and has a lower portion 116 that passes between a light beam produced by a light source 118 and a light detector 120 mounted on support post 110 for most positions of the slide. The lower end of slide 106 is coupled by a universal joint 122 to a shaft 124. The latter in turn is secured to a pin 126 which is eccentrically mounted on a wheel or disc 128. Wheel 128 is in turn fastened on a shaft 130 of a drive motor 132.

The other end of shaft 130 carries a Geneva drive 134 which is coupled by a belt 136 to a drive wheel 138. Drive wheel 138 is in turn fast on one end of a shaft 140 journalled in a shaft housing 142 supported on a mounting bracket 144. The other end of shaft 140 is secured to a sprocket wheel 146 which engages the chain conveyor 34.

The operation of Geneva drive 134 by the motor 132 and the coupling of drive 134 to the sprocket wheel produce an incremental longitudinal movement of the chain conveyor between loading station A and the unloading and classifying station B. At the same time, the operation of the eccentrically mounted shaft 124 causes periodic vertical reciprocation of slide 106 and thus causes the laser beam to periodically scan over the mercury column in the thermometer in response to the positioning of a new thermometer in scanning station F. Since both shaft 106 and Geneva drive 134 are both coupled to the same drive motor, synchronization between conveyor indexing and beam scanning is achieved. A rack section 148 is fixed along one edge of slide 106 and a pinion 150 engages rack section 148 and a gear member (not shown) of a shaft encoder 152 fixedly mounted on post 110. The vertical reciprocatory movement of slide 106 is, by virtue of this arrangement, converted to rotary motion of the gear member in the shaft encoder. As a result, the encoder produces a series of pulses proportional to the extent of vertical movement of slide 106 for reasons which will be described below.

At the time of a new thermometer is indexed into position at station F, the operation of the eccentric causes mirror-carrying slide 106 to be moved to its maximum vertical position along with mirror 102 and rod 114, until the latter no longer interrupts the light beam from source 118. This causes detector 120 to produce a signal indicating the beginning of a new scanning operation for the new thermometer. At this time the operation of the eccentric causes slide 106 to begin its downward travel, causing the laser beam to scan the thermometer from its upper section where there is no mercury in the capillary bore until the discontinuity at the upper level of the mercury column is detected by detector 112 in the manner described above. The detector 112 thereupon produces a first or mercury signal which is applied to a logic circuit described more completely with respect to FIG. 9. Slide 106 continues to move downwardly and the beam continues to scan the mercury column until the reflection from the ink line produced at the first scanning station at the first reference level is detected. Detector 112 thereupon produces a first or mercury signal which is applied to a logic circuit described more completely with respect to FIG. 9. Slide 106 continues to move downwardly and the beam continues to scan the mercury column until the reflection from the ink line produced at the first scanning station at the first reference level is detected. Detector 112 thereupon produces a second or ink line signal which is employed along with the first detection signal in the logic circuit of FIG. 9 to produce an analog signal in the form of a series of output pulses from encoder 150. The number of those pulses is representative of the distance between the two reference levels. These pulses are converted, as described more completely below with respect to FIGS. 9 and 10, to establish a binary classification designation for the thermometer which relates in a predetermined manner to that distance.

UNLOADING AND CLASSIFICATION STATION B

Figure 5:
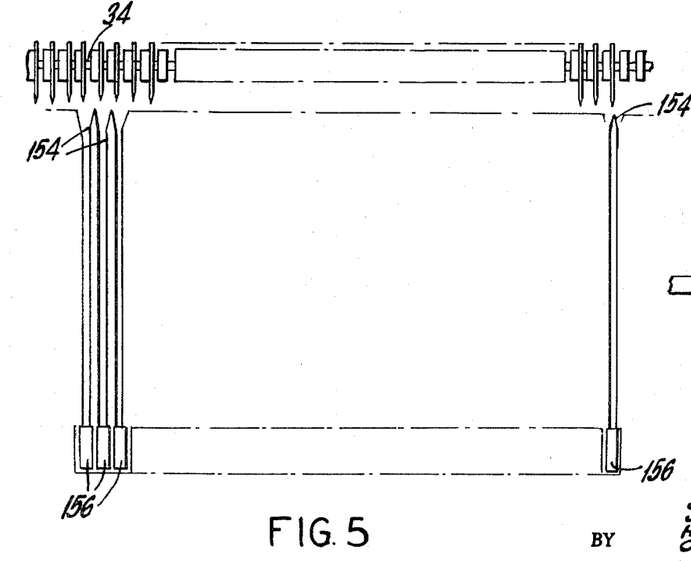
FIG. 5 is an elevation view in schematic form of the instrument unloading and sorting station of the system.

After the thermometers have left the second scanning station, they are transferred to unloading and sorting station B, which is shown schematically in FIG. 5. At station B the thermometers are incrementally carried by the conveyor chain over a plurality of classification chutes 154 which communicate at their lower end with a corresponding plurality of removable bins or compartments 156. A corresponding plurality of solenoids 158 (FIG. 6) are positioned along the conveyor chain, one solenoid being arranged above each of the classification chutes. The axis of the solenoids is substantially normal to the direction of movement of the conveyor past the open upper ends of the chutes.

Figure 7:
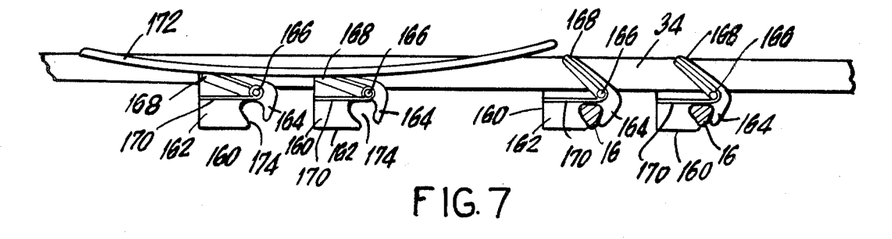
FIG. 7 is a top plan view on an enlarged scale, illustrating the manner in which the instruments are retained and released from the conveyor.
Figure 9:
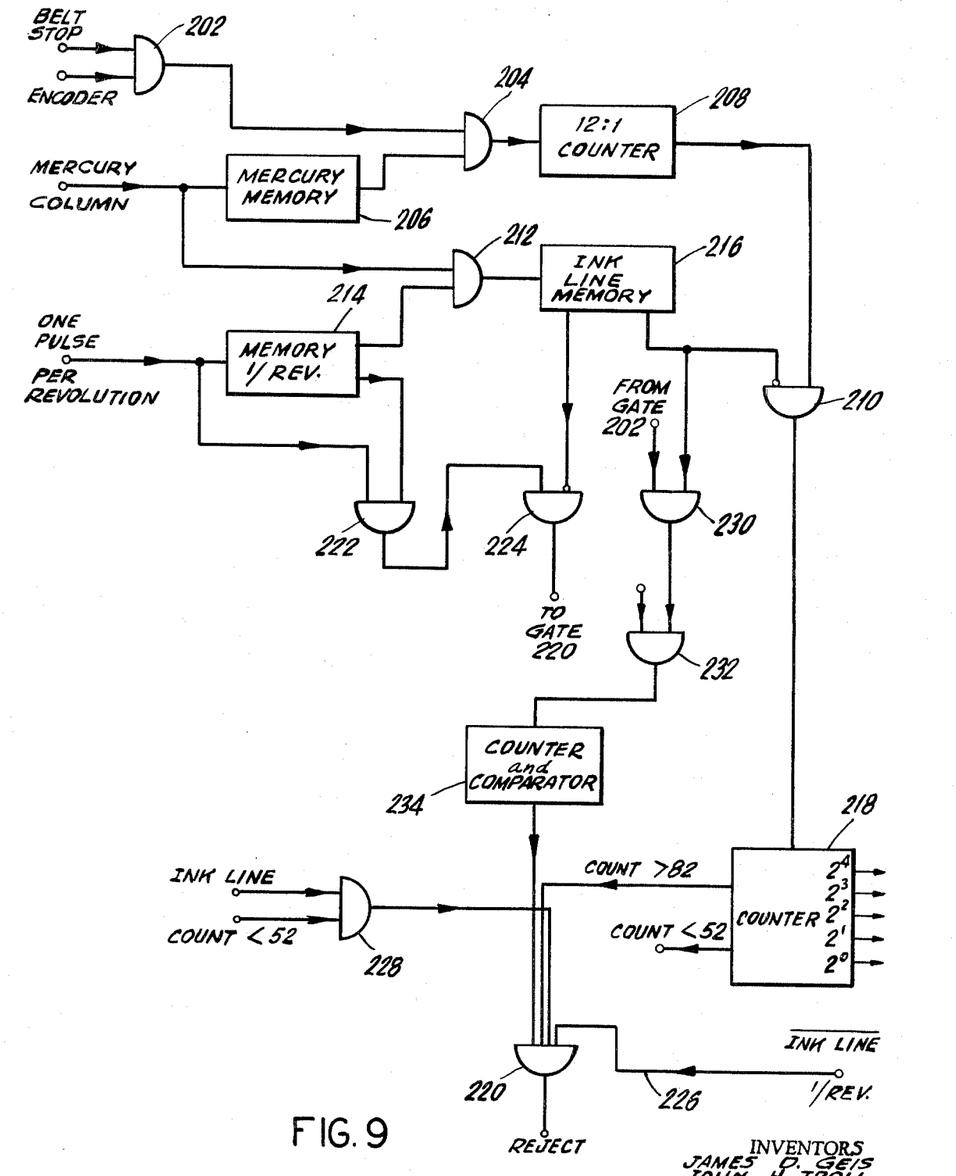
FIG. 9 is a corresponding schematic block diagram of the logic and digitizing circuitry associated with the second scanning station of the system.
Figures 9, 10:
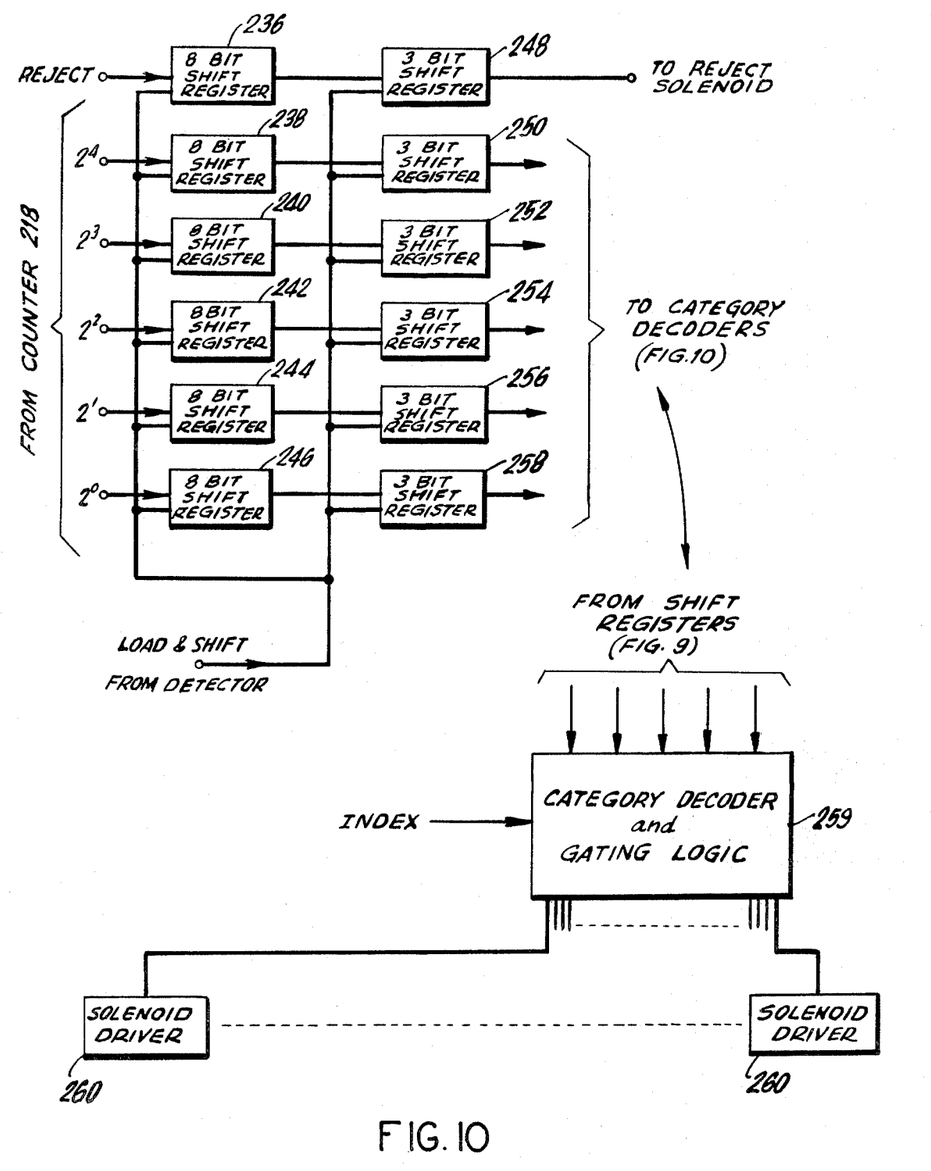
FIG. 10 is a schematic logic diagram of the instrument sorting section of the system.

As described more completely with reference to FIGS. 7 and 10, when a thermometer is positioned over the chute corresponding to its category as determined at scanning station F, the solenoid at that chute is actuated and the thermometer is released from its holder on the conveyor and falls down the classification chute into the designated receptacle located at the lower end of that chute. The position of thermometer release from the conveyor belt is a function of the number of encoder pulses derived at the second scanning station, and the thermometers are thus automatically calibrated and classified according to the temperature levels established and sensed at the first and second scanning stations.

FIG. 7 illustrates the manner in which the thermometers may be loaded onto the conveyor either manually or automatically at loading station A, and carried on the chain until their release at station B. The thermometer holders 160 each comprise a fixed support member or nest 162, and a movable finger or claw member 164 pivotedly mounted on member 162 by a pin 166. Claw members 164 each comprise a release clip 168. A spring 170 is secured to members 162 and 164 and is bent about a pin 166.

Prior to the loading of the thermometers onto the conveyor, the hooks of members 164 are biased away from the arcuate surface of members 162 by means of a depression bar 172 fixedly positioned at the loading station and acting against the release clips of members 164. A space 174 is defined between members 162 and 164 as shown in the two lefthand holders in FIG. 7, which allows the placement therein of an uncalibrated thermometer. As soon as the conveyor moves past the location of depressing bar 172, spring 170 urges member 164 to the position shown in the two right-hand holders in FIG. 7, causing the claw member 164 and the nest 162 to securely grasp the thermometer therebetween.

Figure 6:
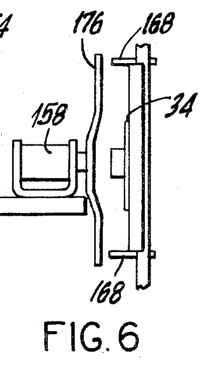
FIG. 6 is an elevation view of the thermometer release mechanism employed at the unloading station of the system.

A typical solenoid control release mechanism at the unloading station is shown in FIG. 6 in which solenoid 158 is shown coupled to a release arm 176 which, when inoperative, is spaced from the release clips 168 of the claw members 164. When the solenoid is activated, arm 176 is moved into contact with release clips 168 to pivot claw member 164 away from the next 162, and thereby cause the thermometer to be released from the holder and fall from the conveyor into the desired classification chute.

Figure 8:
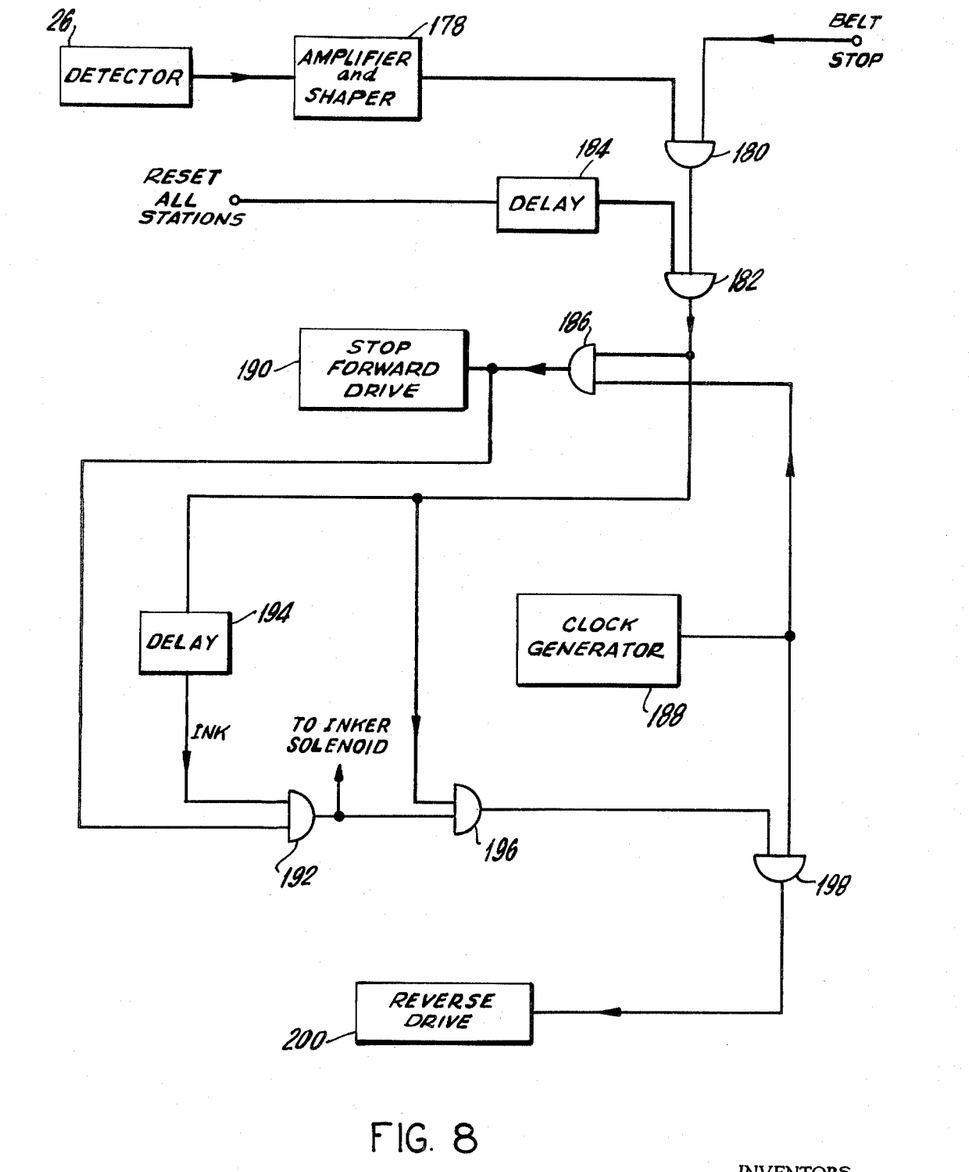
FIG. 8 is a schematic diagram in block form illustrating the beam scanning and inking control circuitry and the first scanning station.

FIG. 8 illustrates in block form the logic and control circuitry employed in the operation of the first scanning station D. The output of detector 26 is coupled to an amplifier and shaper 178 the output of which is coupled to one input of an AND gate 180. The other input to gate 180 is a signal derived from the conveyor indexing mechanism indicating that the conveyor is at a rest position, i.e., that it is not at that time indexing.

When gate 180 receives at its two inputs signals indicating that a meniscus is detected and that the belt is at rest, it produces an output signal which is applied as one input to an AND gate 182. That gate also receives at its other input a signal delayed in delay 184 derived from a limit switch (not shown) at the lowest point to which slide 92 travels to indicate that the slide 92 is reset for a beam scanning operation on a newly indexed thermometer.

When both signals are received at the inputs of gate 182 it produces an output signal which is in turn applied to one input of an AND gate 186, the other input of which receives a train of timing signals from a clock generator 188. When both signals are present at the inputs of gate 186, it produces an output signal which is applied to a stop forward drive circuit 190, such as a relay, to thereupon disable motor 98 and temporarily stop the further vertical movement of carrier 92.

The output of gate 186 is also applied to one input of an AND gate 192, the other input to which receives the output of gate 182 delayed by a delay 194. When both input signals are present at gate 192, it produces an output signal which actuates the inker solenoid (not shown) to cause the inker 32 to produce the reference marker on the thermometer casing as described above. The delay between the stopping of the scan motor and the operation of the inker by delay 194 permits the thermometer position to stabilize prior to the inking operation.

The output of gate 192 is also applied to one input of an AND gate 196 which receives at its other input the undelayed output of gate 182. When both signals are present at the inputs of gate 196, indicating that the motor is at rest and the inker is actuated, gate 196 produces an output signal which is applied to one input of an AND gate 198, the other input of which receives synchronizing signals from clock generator 188.

When signals are present at each input of gate 188, it produces on output signal which is applied to and actuates a reverse drive circuit 200. Circuit 200 when actuated causes motor 98 to be returned to its uppermost position in preparation for a new scanning operation on a newly indexed thermometer.

FIG. 9 illustrates the logic and binary conversion circuitry associated with the operation of scanning station F. An AND gate 202 receives a signal at one input from detector 120 indicating that the conveyor is stopped, to wit, not indexing, and at its other input it receives the output pulses from shaft encoder 152. When both signals are present, gate 202 produces an output signal which is applied to one input of an AND gate 204.

When detector 112 detects the meniscus in the mercury column it produces a signal as noted above, which signal is stored in a mercury level detect memory 206 and applied to the other input of gate 204. Upon the coincidence of signals at the inputs of gate 204, pulses are produced at the output of the gate. Those pulses are coupled to a 12:1 counter 208 in which the number of encoder pulses is divided by twelve. The output pulses of counter 208 are applied to one input of an AND gate 210. The level detector signal is also applied to one input of an AND gate 212. Each time carrier 106 completes one vertical movement in response to a complete revolution of wheel 128, detector 120 produces a signal which is applied to a memory 214.

The output of memory 214 is coupled to the other input of gate 212 which produces at the coincidence of its input signals an output signal indicating that detector 112 has detected the reflection of the laser beam from the inked line. That signal is stored in an ink-line memory 216. The output of memory 216 is applied to an inverted input of gate 210. That gate thus permits the encoder pulses to pass only in the period between the detection of the upper mercury level (the signal from gate 204) and the detection of the inked line (the signal from gate 212). The number of output pulses from gate 210 thus reflects the distance between the two reference levels respectively detected at scanning stations D and F.

Those pulses are applied to the input of a counter 218, which receives the analog pulse train and converts the number of these pulses into a five-bit parallel work. That word defines in binary form one of 31 categories based on the spacing between the two reference levels. In the embodiment of the invention herein described, a count of greater than 82 or less than 52 is considered to be unacceptable for use and calibration. When this occurs, counter 218 also provides an over 82 signal and an under 52 signal. The former is applied to one input of an OR gate 220 to thereby produce a reject signal.

The revolution pulse and the output of memory 214 are applied respectively to the two inputs of an AND gate 222, the output of which is in turn coupled to one input of an AND gate 224. The other inverted input to gate 224 is received from the ink line memory 216 so that the output of gate 224 when present indicates a complete scan and an absence of an ink line. The output of gate 224 is applied at line 226 and to another input of OR gate 220.

The under 52 signal from counter 218 and the ink line signal from memory 216 are both applied to the two inputs of an AND gate 228, the output of which is applied to a third output of OR gate 220. The outputs of gate 202 and memory 216 are applied respectively to the two inputs of an AND gate 230, the output of which is applied to one input of an AND gate 232. The other input to gate 232 is the revolution pulse derived from detector 120. The output signal from gate 232 indicates that the encoder is producing output pulses, that the ink line is sensed, and that the slide has gone through a complete scanning cycle. That signal is applied to a counter and comparator 234. When the latter counts a number of encoder pulses less than a predetermined number (e.g. 313 in an actual embodiment of the invention), the signal from gate 232 is allowed to transfer a signal to another input of OR gate 220 which in turn produces a reject signal. This control reject feature is provided to ensure that the mercury signal detected when the beam is scanned over the meniscus is in fact a true meniscus rather than the top of the thermometer casing which may produce a similar reflection of the beam. The latter situation may arise when a relatively short thermometer is indexed into the second scanning station. As soon as counter 234 counts more than the predetermined minimum number of encoder pulses, its logic inhibits the gate 232 signal from OR gate 220 and thus permits the counting of the encoder pulses in counter 218.

For any input at OR gate 220 a reject signal is provided indicating a thermometer in which the distance between the reference point is outside an acceptable value, or an improper operation of the encoder or the inking and scanning stations.

Figure 11:
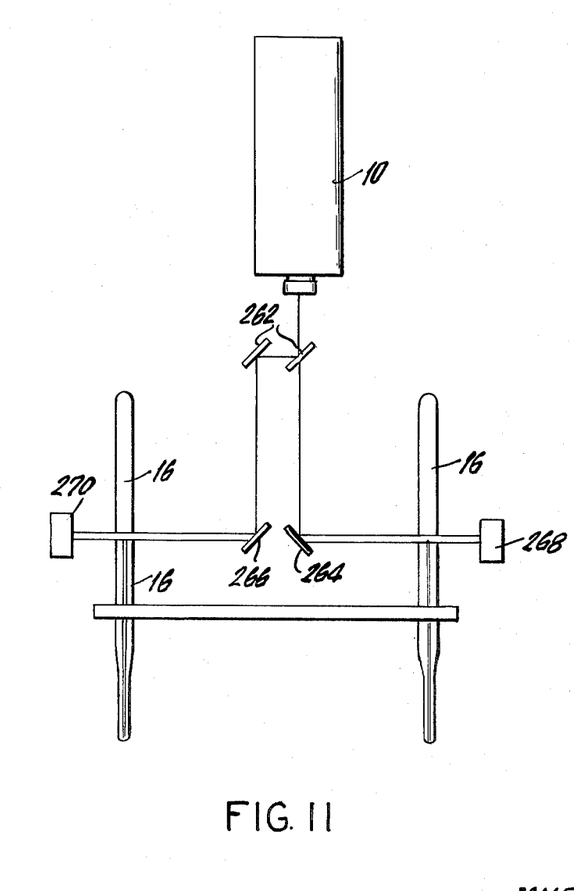
FIG. 11 is a view in schematic form similar to FIG. 1 of an alternate embodiment of the invention.

FIGS. 10 and 11 illustrate schematically the logic circuitry associated with the classifying and unloading operation that takes place at station B. The 5-bit parallel classification word from counter 210 and the reject signal from gate 220, if present, are applied respectively to the inputs of 8-bit shift registers 236–246. The outputs of shift registers 236–246 are respectively applied to the inputs of 3-bit shift registers 248–258. The shift inputs of all shift registers receive shifting signals from detector 120 in scanning station F indicating an indexing operation on the thermometers. The series-connected shift-registers thus provide an eleven-step delay between the scanning operation at station F and the arrival of the thermometer at the sorting and unloading station B.

The delayed 5-bit word, representing which one of the 31 categories the thermometer is assigned by virtue of the distance between the two reference levels, is applied to a category decoder and logic circuit 259 (FIG. 10) which also receives conveyor indexing signals indicating the position of the thermometer in the sorting station. When a coincidence is sensed between the assigned category binary number and the thermometer position at station B, e.g., category and position code number 13, a signal is produced and applied to the solenoid drive circuit 260 which is coupled to the solenoid located at the corresponding (number 13) classification chute. In this manner, the thermometer is unloaded into that receptacle located at the lower end of the category 13 chute specifically assigned to receive all thermometers falling into that category.

On the other hand, if a reject signal is received at decoder-logic circuit 259 for any of the reasons listed above, only the reject solenoid is actuated and the thermometer is unloaded from the conveyor by operation of the reject solenoid when it arrives at the discharge chute.

FIG. 11 illustrates a possible modification of the first scanning station which permits the use of a single laser beam to simultaneously scan two continuously moving rows of thermometers to detect the upper level of the mercury column in a manner similar to that described above. As therein shown, the laser beam is caused to be incident on a beam splitter 262 which directs a portion of the laser beam onto a pair of mirrors 264 and 266 which can be moved vertically with respect to the thermometers to achieve beam scanning over the mercury column. The transmission characteristics of the laser beam at the mercury columns are detected at detectors 268 and 270 to produce signals which may be employed in a continuous calibrating and classifying operation in a manner similar to that described above.

The system of the invention thus provides means for automatically calibrating and classifying instruments such as clinical thermometers in a continuous manner while still achieving precision of calibration. The system of the invention operates in a relatively high speed manner and produces results which are repeatable over long periods of use involving a great many thermometers. Precision of calibration is achieved in the system of the invention by the use of a narrow laser beam which produces a characteristic change in reflectivity or transmissivity upon the sensing of the upper level or meniscus of the mercury column within the thermometer.

While the system has been herein described with particular reference to the calibration and classification of clinical thermometers, it may also be utilized to equal advantage with other thermometers such as outdoor or indoor weather thermometers, or in other measuring instruments such as barometers or the like, in which a medium is caused to move within an enclosed capillary bore in response to the level of a sensed external parameter.

Moreover, while in the embodiments shown the detector is located on the carrier at a location above the mirror, it could also be carried on the same plane as the mirror and positioned with its optical axis along the axis of the reflected laser beam. While the forming of the ink line at the first reference level is achieved in the described embodiment by an ink spraying device, that line may also be formed by other means such as contacting the thermometer casing with an impregnated felt member. The ink line could also, if desired, be formed at the upper reference level as well as the first or lower reference level. The thermometer release mechanism could also include a hydraulic or pneumatic solenoid as well as the electrical solenoid as herein described.

Thus while the invention has been herein described with particular reference to several of its embodiments, it will be understood that variations and modifications may be made therein, all without departing from the spirit and scope of the invention.

We claim:

1. A system for automatically calibrating an instrument of the type having a medium extending axially within a relatively narrow column in response to the value of a sensed external parameter, said system comprising means for establishing a first reference parameter at the instrument to thereby cause the medium to rise in the column to a first reference level corresponding to the value of said first reference parameter, first means for scanning a first narrow beam of light over the instrument, first means located in the optical path of said light beam for detecting when said light beam is directed at said first reference level, means spaced from said parameter establishing means for establishing a second reference parameter different from said first reference parameter at the instrument to cause the medium to rise to a second reference level in the column, second means for scanning a second narrow light beam over the instrument, and second means for detecting when said second beam is directed at the medium at said second reference level.

2. The system of claim 1, further comprising means coupled to said first and second detecting means for respectively deactivating said first and second beam scanning means when said beam is directed at said first and second reference levels.

3. The system of claim 2, further comprising first and second indicia forming means respectively coupled to said first and second scanning means and movable along therewith, and means coupled to said first and second detecting means for respectively activating said first and second indicia forming means to thereby respectively establish indications on said instrument at said first and second reference levels.

4. The system of claim 1, further comprising means coupled to said second scanning means for sensing the distance along the column between said first and second reference levels.

5. The system of claim 4 in which said first and second scanning means respectively comprise first and second sources of laser beams, said laser beams respectively defining said first and second narrow light beams, a carrier, first and second reflecting means receiving said laser beams thereon and secured to said carrier, and means for producing relative motion between said carrier and the instrument.

6. The system of claim 5, further comprising means for deriving a first signal corresponding to the distance between said first and second temperature levels, and an instrument release station having a plurality of classifying units, means for transferring the instrument from said second parameter establishing means to said release station, and means responsive to said distance signal and to the position of the instrument for releasing the latter at said release station at a preselected one of said classifying units.

7. The system of claim 6, in which said second scanning means comprises a second carrier carrying said second detecting means, and second reflecting means carried on said second carrier, said distance sensing means comprising means for producing a signal relative to the displacement of said second carrier between said first and second reference levels.

8. The system of claim 7, in which said distance signal producing means comprises encoder means coupled to said second carrier for producing a number of pulses proportional to the distance traveled by said second carrier, and further comprising pulse counting means, means for beginning the counting of said pulses in response to the detection of said second reference level, and means for ending the counting of said pulses in response to the detection of said indication formed on the instrument by said indicia forming means.

9. The system of claim 1, further comprising first and second indicia forming means respectively coupled to said first and second scanning means and movable along therewith, and means coupled to said first and second detecting means for respectively activating said first and second indicia forming means to thereby establish indications on said instrument at said first and second reference levels.

10. The system of claim 9, further comprising means coupled to said second scanning means for sensing the distance along the column between said first and second reference levels.

11. The system of claim 10, further comprising means for deriving a first signal corresponding to the distance between said first and second temperature levels, an instrument release station having a plurality of classifying units, means for transferring the instrument from said second parameter establishing means to said release station, and means responsive to said distance signal and to the position of the instrument for releasing the latter at said release station at a preselected one of said classifying units.

12. The system of claim 10, in which said second scanning means comprises a second carrier carrying said second detecting means, and second reflecting means carried on said second carrier, said distance sensing means comprising means for producing a signal relative to the displacement of said second carrier between said first and second reference levels.

13. The system of claim 10, in which said distance signal producing means comprises encoder means coupled to said second carrier for producing a number of pulses proportional to the distance traveled by said second carrier, and further comprising pulse counting means, means for beginning the counting of said pulses in response to the detection of said second reference level, and means for ending the counting of said pulses in response to the detection of said indication formed on the instrument by said indicia forming means.

* * * * *